June 10, 1924.
O. C. MEYER
AUXILIARY MACHINING ATTACHMENT FOR LATHES
Filed Jan. 15, 1923
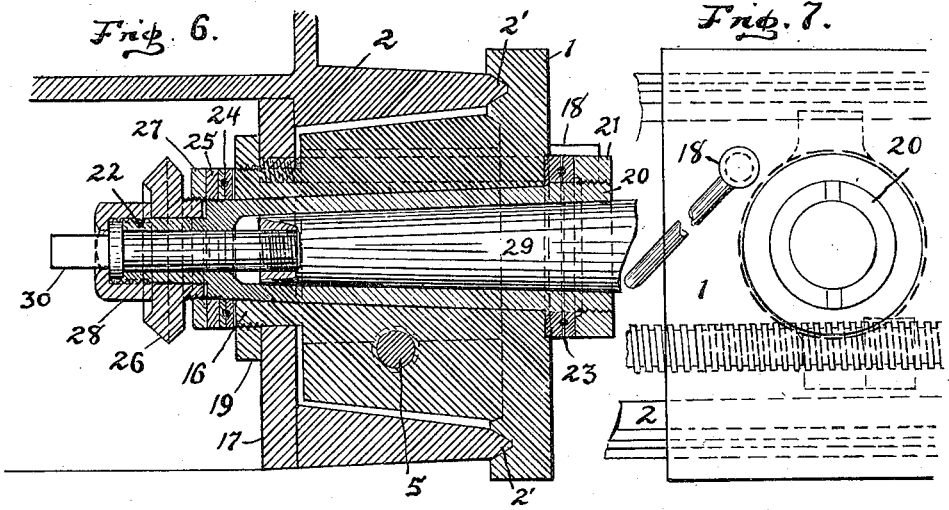
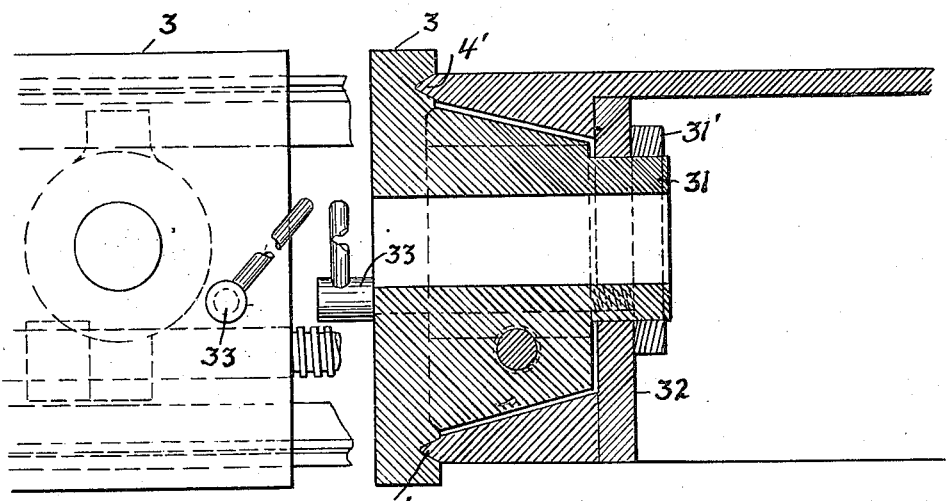
Otto C. Meyer INVENTOR
BY
H. G. Burns ATTORNEY June 10, 1924.
O. C. MEYER
AUXILIARY MACHINING ATTACHMENT FOR LATHES
Filed Jan. 15, 1923   5 Sheets-Sheet 4
1,497,113
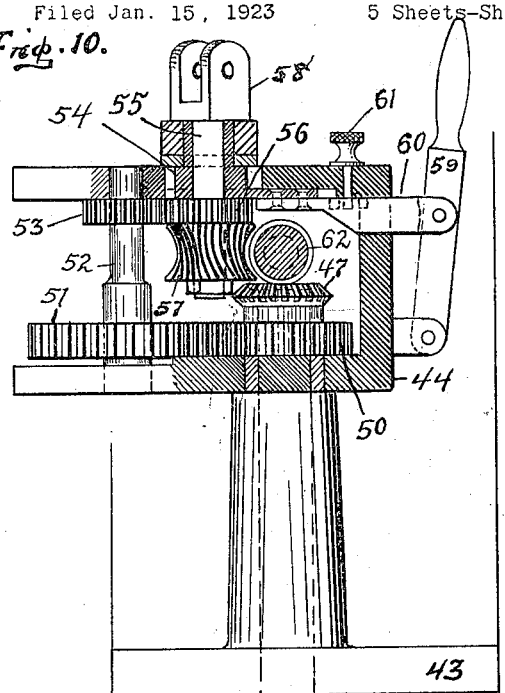
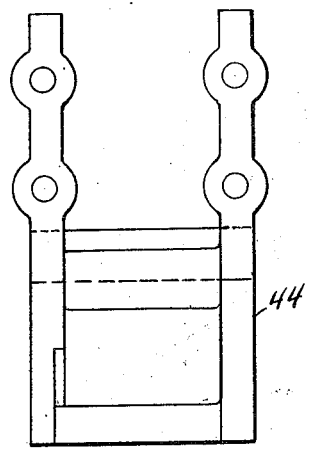
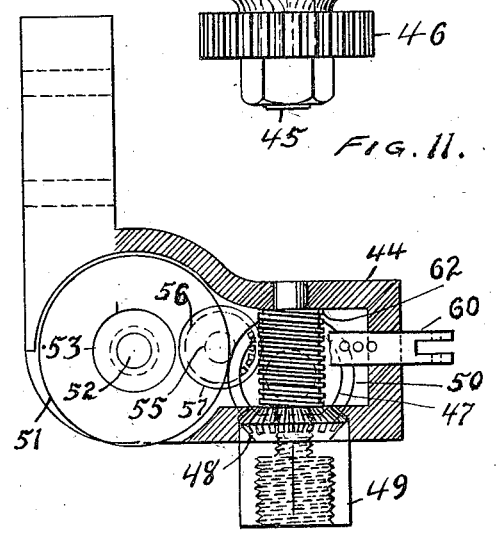
Otto C Meyer INVENTOR.
BY
W. G. Burns ATTORNEY.

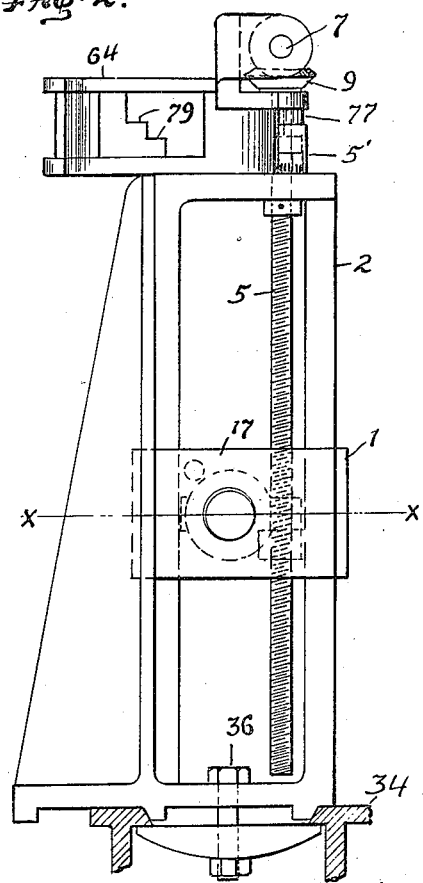
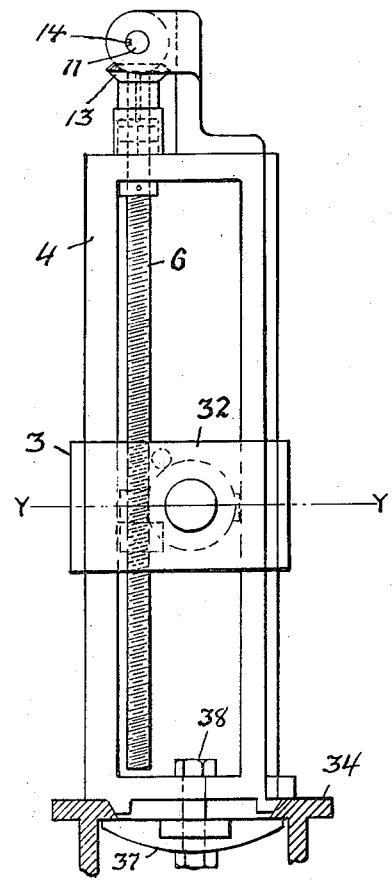
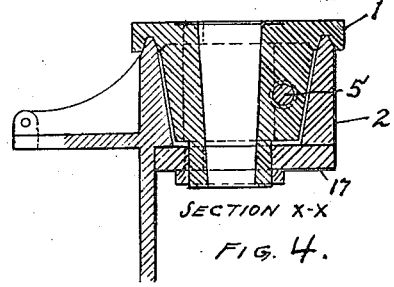
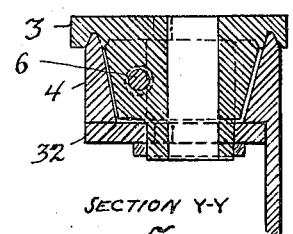

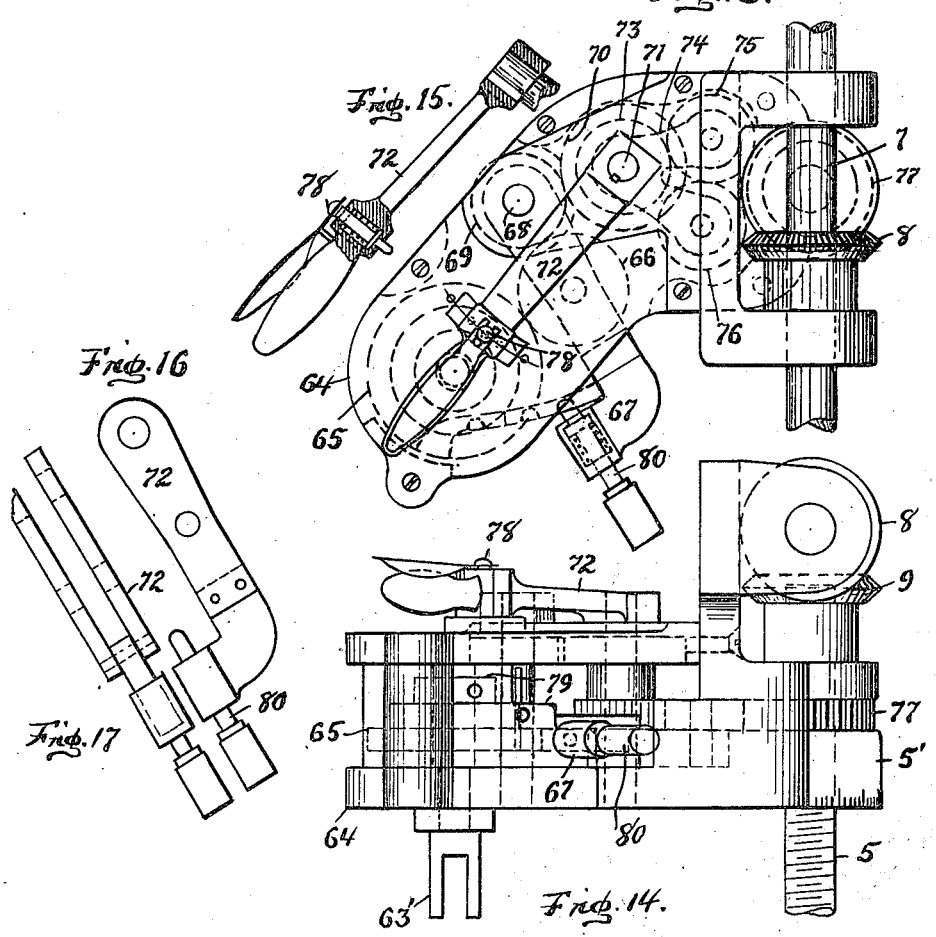

Patented June 10, 1924.

1,497,113

UNITED STATES PATENT OFFICE.

OTTO C. MEYER, OF FORT WAYNE, INDIANA, ASSIGNOR OF ONE-HALF TO FRED C. MEYER, OF STURGIS, MICHIGAN.

AUXILIARY MACHINING ATTACHMENT FOR LATHES.

Application filed January 15, 1923. Serial No. 612,667.

*To all whom it may concern:*

Be it known that I, OTTO C. MEYER, a citizen of the United States of America, and resident of Fort Wayne, in the county of Allen and State of Indiana, have invented certain new and useful Improvements in Auxiliary Machining Attachments for Lathes, of which the following is a specification.

This invention relates to improvements in auxiliary machining attachments for lathes and the objects thereof are: First, to provide means in conjunction with a turning lathe for executing milling operations; second, to provide an attachment for a lathe by means of which boring and drilling operations may be carried out on parts of greater size than can be accommodated by the lathe alone; third, to provide an attachment operable in conjunction with a lathe and having a head and a tail member so supported and mechanically connected as to be vertically adjusted simultaneously; fourth, to provide an attachment for a lathe having vertically movable head and tail members in connection with means for maintaining said members in axial alinement during the vertical movements thereof; fifth, to provide an attachment for a lathe having vertically movable head and tail members in conjunction with automatic means for the simultaneous movement of said members; and sixth, to provide an inexpensive means of performing milling and other machine operations upon a lathe of ordinary construction.

These objects are accomplished by the construction illustrated in the accompanying drawings, in which:—

Fig. 2 is a front end elevation of the head frame;

Fig. 3 is a rear end view of the tail frame;

Fig. 4 is a section of Fig. 2 on the line *x—x* thereof;

Fig. 5 is a section of Fig. 3 on the line *y—y* thereof;

Fig. 6 is a transverse central section through the movable head member;

Fig. 7 is a projection from Fig. 6;

Fig. 8 is a transverse central section through the vertically movable tail member;

Fig. 9 is a projection from Fig. 8;

Fig. 10 is a detail view showing an elevation of the gear shifting means for controlling the elevating means for the head and tail members, there being parts in section;

Fig. 11 is a partial plan view of Fig. 10, there being a portion in section;

Fig. 12 is a projection from Fig. 11;

Fig. 13 is a detail showing a plan view of the transmission gearing for the elevating mechanism;

Fig. 14 is a projection from Fig. 13;

Fig. 15 is a projection of the reverse lever shown in Fig. 13;

Fig. 16 is a projection from the speed-change lever shown in Fig. 13; and

Fig. 17 is a projection from Fig. 16.

The characters appearing in the description refer to parts shown in the drawings and designated thereon by corresponding characters.

Figure 1:
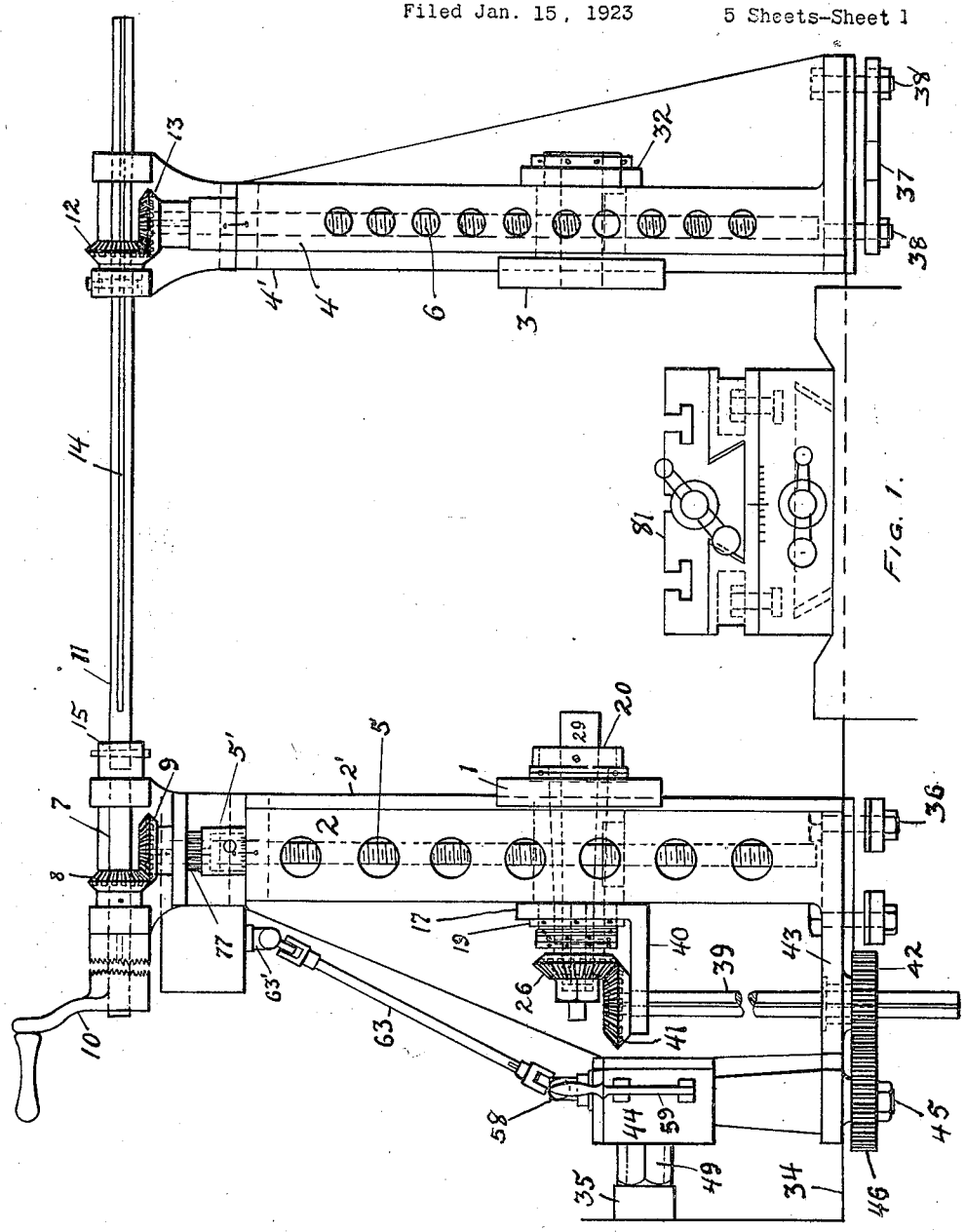
Fig. 1 is a front elevation of a mechanism embodying the invention and including also parts of a turning lathe of usual construction.

The invention comprises a head block 1 mounted in a vertically disposed head frame 2, and a tail block 3 mounted in a vertically disposed tail frame 4, each of said blocks being vertically movable in their respective frames, there being V-ways 2' on the head frame and similar V-ways 4' on the tail frame for the guidance of said blocks respectively. In the head frame is a vertical screw 5 that has engagement with the head block 1 so that the block is moved vertically more or less accordingly as the screw is turned. In the tail frame is a vertical screw 6 that has engagement with the tail block 3 so that the tail block is moved vertically more or less accordingly as the screw is turned.

In the top of the head frame is mounted a shaft 7 having a gear 8 thereon that meshes with the gear 9 on the top of the screw 5 by means of which the screw is actuated. The shaft 7 has also thereon a detachable crank 10 for its manual operation. In the top of the tail frame is mounted a shaft 11 so as to have both turning and longitudinal movements therein, and mounted on said shaft is a gear 12 that meshes with another gear 13 on the top of the screw 6 by means of which the screw is actuated. The gear 12 has engagement in a longitudinal key-way 14 in the shaft 11 and is rotated accordingly as the shaft rotates but admits of longitudinal movement of the shaft in the gear. The shafts 7 and 11 are connected in alinement by means of a coupling 15 so that said shafts rotate together, and as a result the screws 5 and 6 are turned and the head and tail blocks are simultaneously raised or lowered accordingly as said shafts are rotated. Vertical adjustment of the tail block 3 relative to the head-block may be made by loosening the coupling 5' on the screw 5 and turning the crank 10 so the screw 6 will be operated while the screw 5 is idle.

The head block 1 has a hub 16 which extends through a clamp-plate 17 that bears against the head frame at points opposite the V-ways thereon, and a hand-screw 18 in the block engages the plate and serves to bind the block in adjusted positions on the frame. A collar 19 on the end of the hub limits the play of the clamp plate. Extending horizontally through the head block is a rotatable spindle 20 having a collar 21 at one end and a reduced extension 22 at its opposite end. Between the shoulder and the adjacent face of the block is placed a ball-bearing 23, and a similar ball-bearing 24 is placed on the other end of the spindle between the hub 16 and a collar 25 which is threaded on the spindle. Upon the extension 22 is placed a pinion 26 having a collar 27 threaded on its hub and which bears against the collar 25 on the spindle when the nut 28 on the extension 22 is tightened against the pinion. By adjustably turning the collar 25 the ball-bearings may be more or less confined and the longitudinal play of the spindle effected accordingly. By adjustably turning the collar 27 on the pinion, longitudinal adjustments of the pinion on the extension 22 may be made. In the spindle is secured the tapered shank of a mandrel 29, or other tool, there being a bolt 30 that passes through the extension 22 and engages the inner end of the shank.

The tail block 3 has a hub 31 which extends through a clamp-plate 32 that bears against the tail frame at points opposite the V-ways thereon, and a hand-screw 33 in the block engages the plate and serves to bind the block in adjusted positions on the frame, there being a collar 31' on the hub to limit the play of the plate.

The head-frame 2 is positioned upon the bed 34 of a lathe ahead of its spindle 35 and is fixed thereon by bolts 36, and the tail spindle 4 is moved longitudinally on the bed to a position suitably distant from the head frame and is there secured by a clamping plate 37 and bolts 38.

Rotary movement is imparted from the lathe spindle 35 to the spindle 20 in the head block by means of a transmission mechanism comprising a slotted shaft 39 mounted in a foot 40 that extends from the clamp-plate 17 on the head block, there being a pinion 41 engaging the pinion 26 on the spindle. The shaft 39 is vertically movable in a gear 42 the hub of which has bearing in the base 43 of the frame 2. A housing 44 on the base 43 has a vertical shaft 45 on the lower end of which is a gear 46 that meshes with the gear 42, and upon the upper end of which is a pinion 47 that is actuated by a pinion 48 on the driving member 49, the hub of the latter being screwed on the lathe spindle. On the shaft 45 is also a spur gear 50 that meshes with a back gear 51 which rotates with a shaft 52 having a smaller gear 53 fixed thereon.

In the top of the housing 44 is a horizontally movable slide 54 having mounted therein a vertical stub-shaft 55 upon which is fixed a gear 56, worm-wheel 57 and a coupling 58. A hand-lever 59 is coupled with the slide by a perforated bar 60 that may be locked selectively in extremely opposite or intermediate positions by a pin 61 in the housing. Thus the slide may be positioned so that the gear 56 will engage the gear 53; or so that the worm-wheel 57 will engage the worm 62 which is on the driving member; or, held in neutral position so that neither the gear nor the worm are engaged. With this arrangement the shaft 55 is caused to rotate selectively at different speeds in opposite directions.

Movement is imparted to the screw 5, and indirectly to the screw 6, from the shaft 55 by means of speed-change and reverse transmission mechanism which is connected with the shaft by a universal coupling 63. This transmission mechanism comprises a housing 64 mounted on top of the head-frame 2, and in which are mounted a series of gears 65 of varying diameters and arranged in axial alinement, and which are selectively engaged by an intermediate gear 66 on the gear-shift lever 67 that swings and also is vertically movable on a stud 68 in the housing. A gear 69 on the stud meshes with the gear 66 and also with another gear 70 that is mounted upon an oscillating shaft 71 which has fixed thereon a reverse gear lever 72. Movable on the shaft 71 with the gear 70 is a smaller gear 73, and fixed on said shaft is a frame 74 having mounted thereon a pair of meshing gears 75 and 76 respectively, the gear 75 also meshing with the gear 76. Upon the coupling 5' is mounted a gear 77 with which the pair of gears 75 and 76 have selective engagement accordingly as the reverse-gear lever is adjusted. The series of gears 65 are fixed on the coupling member 63' which is actuated by the universal coupling 63, and the variation of the speed imparted by the transmission mechanism to the screw 5 is effected by corresponding variations in the positions of the gear-shift lever 67.

A latch-pin 78 on the reverse-gear lever serves to hold it in either of its extremely opposite, or in its neutral positions. Also, a series of steps 79 formed in the wall of the housing support the gear-shift lever in its several elevated positions and in which it is locked by a latch pin 80.

In operating the invention a suitable tool 29 of usual construction is secured in the spindle 20, and the object (not shown), upon which machine operations are to be performed, is mounted upon the carriage 81 of the lathe. The carriage may then be moved in the customary manner so as to feed the object to the tool revolved by the spindle. In this manner the cuts made in the work will be horizontal. Should it be desired to perform vertical cuts, the tool is fed to the object on the carriage by imparting vertical movement to the head and tail blocks by manipulating the various levers 59, 67 and 72 according to the speed and direction of travel desired. Where the tool is of the nature of a boring bar it may be supported by the tail block as well as by the spindle in the head block and moved vertically therewith.

When the operation consists in the making of a succession of vertical cuts, it is desirable that the vertical movement of the head and tail blocks during the cutting operation shall be at a speed consistent with the size of the cut made, which ordinarily of necessity would be slower than that required during the return movement when the tool runs free. To effect this condition it is only necessary to set the reverse lever 72 in one extreme position or the other according to the direction of the cutting stroke, and then manipulate the operating lever 59 from one extreme position to the other at the respective ends of the stroke. The speed of the operations may be varied by adjustably positioning the gear-shift lever 67. When it is desired to feed the tool manually, the operating lever 59 is shifted to its intermediate or neutral position and then by turning the crank 10 in one direction or the other the head and tail blocks supporting the tool are simultaneously raised and lowered accordingly.

What I claim is:—

1. In a machining attachment for a turning lathe having a driving spindle and a carriage, a pair of vertically disposed frames spaced apart and mounted upon the bed of the lathe; a vertically movable block in each frame; a vertically disposed screw in each frame having engagement with the corresponding block therein; a gear mechanism on said frames for the simultaneous operation of said screws, said mechanism including a slotted shaft upon which one of the frames is adjustably movable lengthwise; a head spindle horizontally disposed in one of said blocks; a reversible gear mechanism actuated by the driving spindle and including a control lever therefor; a vertically disposed slotted shaft having geared relation with the head spindle and driven relation with the reversible gearing and being lengthwise adjustable relative thereto; a speed change gearing including reversing means and control levers therefor, and having driving relation with said gear mechanism and driven relation with said reversible gearing; a coupling in connection with said gear mechanism having releasable connection with one of said screws; and a clamping means on each block for securing the same in adjusted positions upon the corresponding frame.

2. In a machining attachment for a turning lathe having a driving spindle and a carriage, a pair of frames, vertically disposed and spaced apart, mounted upon the bed of the lathe; a vertically movable block in each frame; a vertically disposed screw in each frame having engagement with the correspondng block therein; a gear mechanism on said frames for the simultaneous operation of said screws; means for disconnecting one of said screws from said gear mechanism; a head spindle horizontally disposed in one of said blocks; a reversible gear mechanism including a control lever therefor and having engagement with the driving spindle to be actuated thereby, and having also geared connection with the head spindle; and a clamping means for securing each block in adjusted positions upon the corresponding frame.

3. In a machining attachment for a turning lathe, a pair of frames oppositely disposed and positioned upon the bed of the lathe; a vertically movable head block in one of said frames; a vertically movable tail block in the other frame; a feed mechanism for the simultaneous movement of said blocks; means for throwing one of said blocks out of operative connection with the feed mechanism, a head spindle mounted in the head block and having geared connection with the lathe to be actuated thereby; and a gearing for imparting movement from the lathe to said feed mechanism selectively in opposite directions.

4. In a machining attachment for a turning lathe, a pair of frames oppositely disposed and positioned upon the bed of the lathe; a vertically movable head block in one of said frames; a vertically movable tail block in the other frame; a feed mechanism for the simultaneous movement of said blocks; a head spindle mounted in the head block and having geared connection with the lathe to be actuated thereby; and a gearing for imparting movement from the lathe to said feed mechanism selectively in opposite directions.

5. In a machining attachment for a lathe, a pair of frames spaced apart and positioned upon the bed of a lathe; a vertically movable block in each frame; a feed mechanism for the simultaneous movement of said blocks; a head spindle mounted in one of said blocks and having geared connection with the lathe to be actuated thereby; a reversible gearing actuated by the lathe adapted to actuate the feed mechanism at different speeds selectively in opposite directions; and a lever for controlling said gearing.

6. In a machining attachment for a lathe; a supporting means mounted upon the bed of a lathe; vertically movable head and tail blocks spaced apart and mounted upon said supporting means; a feed mechanism for the simultaneous movement of said blocks; a head spindle mounted in the head block and having geared connection with the lathe to be actuated thereby; a reversible gearing actuated by the lathe; a speed change gearing actuated by the reversible gearing; a second reversible gearing actuated by the speed change gearing and having driving relation with said feed mechanism; and a control lever for each of said gearings.

7. In a machining attachment for a lathe, a head block and a tail block including supporting means therefor mounted upon the bed of the lathe; a feed mechanism for the simultaneous vertical movement of said blocks; a head spindle mounted in the head block having geared connection with the lathe to be actuated thereby; a transmission gearing for actuating the feed mechanism; and a reversible gearing actuated by the lathe and having engagement with the transmission gearing, and being adapted to actuate the transmission mechanism at different speeds selectively in opposite directions.

8. In a machining attachment for a lathe, head and tail blocks including supporting means therefor mounted upon the bed of the lathe; a head spindle mounted in said head block having geared connection with the lathe to be actuated thereby; a feed mechanism including a geared connection with the lathe for the simultaneous vertical movement of said blocks; and means controlling said gear mechanism adapted to reverse the action thereof.

9. In a machining attachment for a lathe, head and tail blocks including supporting means therefor mounted upon the bed of the lathe; a head spindle mounted in said head block having geared connection with the lathe to be actuated thereby; and a feed mechanism having geared connection with the lathe for the simultaneous vertical movement of said blocks.

10. In a machining attachment for a lathe, a head block including supporting means therefor mounted upon the bed of the lathe; a feed mechanism for the vertical movement of the head block upon its support; a head spindle extending horizontally through said block; a bevel gear mounted upon one end of the spindle and having longitudinal adjustment thereon; a vertical shaft supported in connection with the head block and being vertically movable therewith; a bevel gear on said shaft meshing with the former gear; a transmission mechanism actuated by the lathe, and in which the shaft has vertical sliding movement and being adapted to rotate the shaft; and a feeding means for the vertical movement of the head block.

11. In a machining attachment for a lathe, a head block including supporting means therefor mounted upon the bed of the lathe; a mechanism for the vertical movement of the head block upon its support; a head spindle extending horizontally through said block; a bevel gear mounted upon one end of the spindle and having longitudinal adjustment thereon; a vertical shaft supported in connection with the head block and being vertically movable therewith; a bevel gear on said shaft meshing with the former gear; and a transmission mechanism actuated by the lathe, and in which the shaft has vertical sliding movement and being adapted to rotate the shaft.

12. In a machining attachment for a lathe, a horizontally disposed and vertically movable head block including supporting means therefor mounted upon the bed of the lathe; a head spindle mounted horizontally in the block; a sliding shaft having geared connection with the spindle; a gearing actuated by the lathe for imparting movement to the head spindle through the medium of said shaft; and a feed mechanism actuated by the lathe and operable to move the head block.

In testimony whereof I affix my signature in presence of two witnesses.

OTTO C. MEYER.

Witnesses:
MATILDA METTLER,
WALTER G. BURNS.